Nov. 30, 1965  G. E. ROWE  3,220,566
TAKE-OUT MECHANISM FOR DOUBLE GOB GLASSWARE FORMING MACHINE
Filed March 13, 1964  3 Sheets-Sheet 1
FIG_1
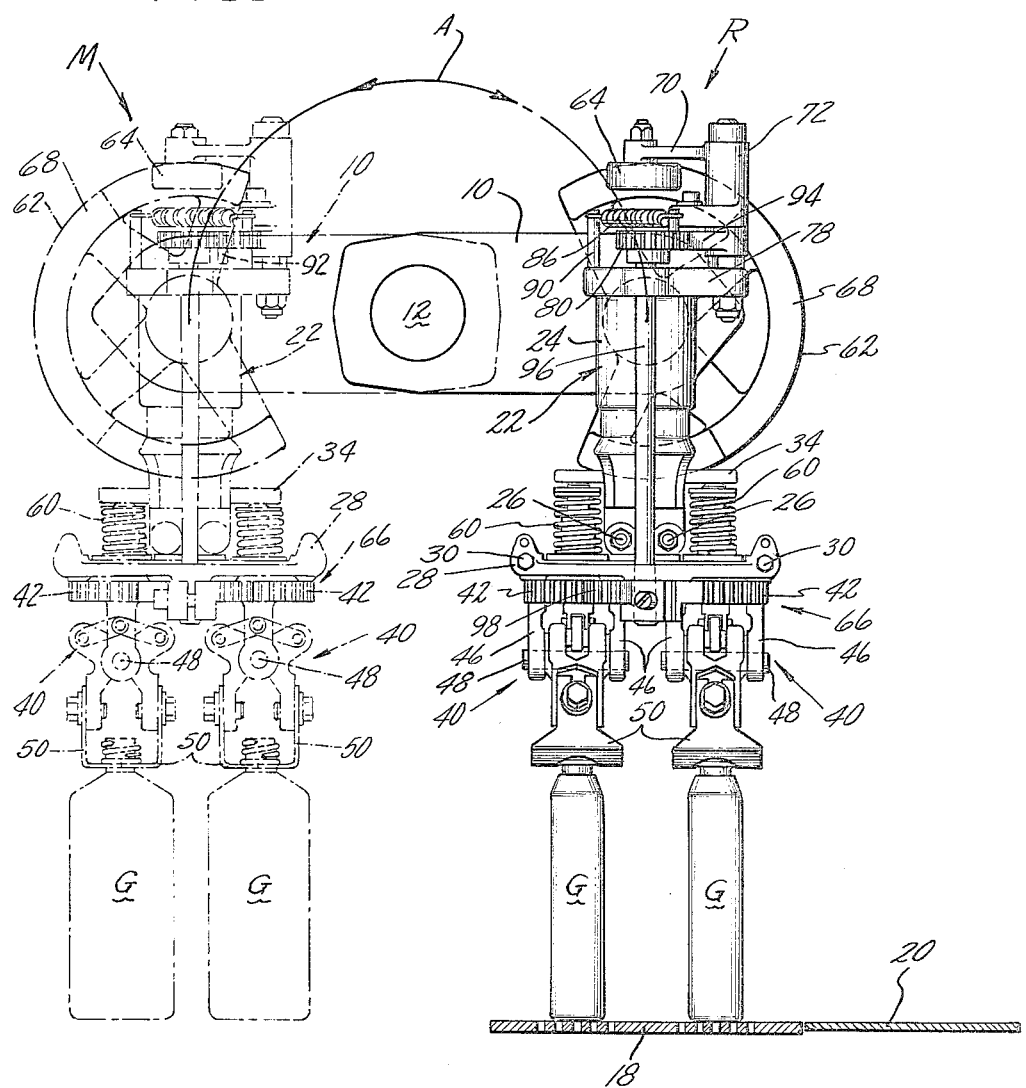
INVENTOR
GEORGE E. ROWE
BY McCormick, Paulding & Huber
ATTORNEYS Nov. 30, 1965 G. E. ROWE 3,220,566
TAKE-OUT MECHANISM FOR DOUBLE GOB GLASSWARE FORMING MACHINE
Filed March 13, 1964 3 Sheets-Sheet 2
FIG_5
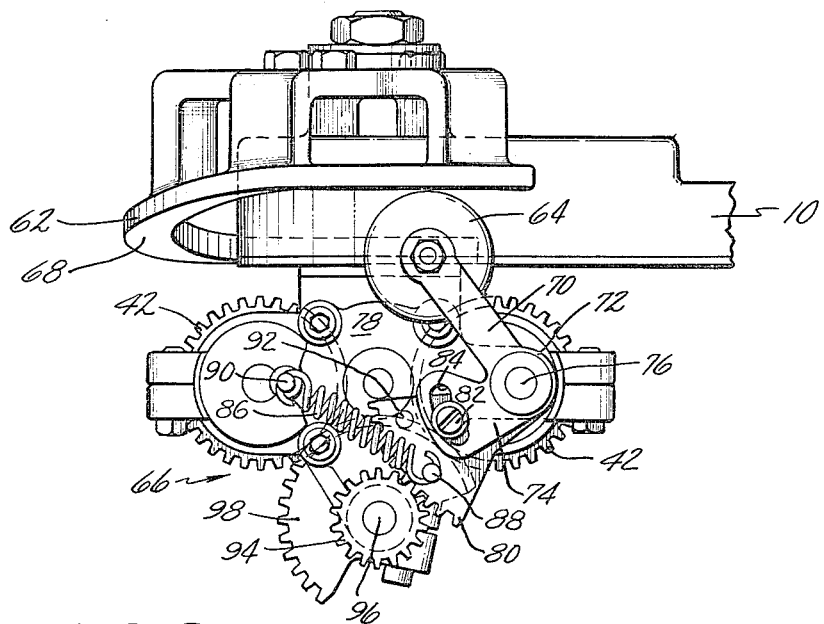
FIG_2
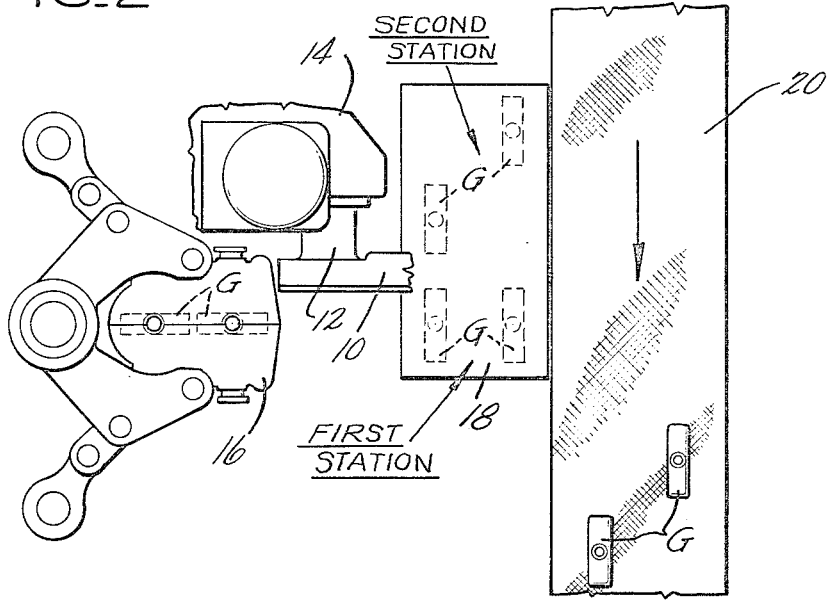
INVENTOR
GEORGE E. ROWE
BY McCormick, Paulding & Huber
ATTORNEYS Nov. 30, 1965

G. E. ROWE 3,220,566

TAKE-OUT MECHANISM FOR DOUBLE GOB GLASSWARE FORMING MACHINE

Filed March 13, 1964

INVENTOR
GEORGE E. ROWE

BY McCormick, Paulding & Huber
ATTORNEYS

United States Patent Office 3,220,566
Patented Nov. 30, 1965

3,220,566
TAKE-OUT MECHANISM FOR DOUBLE GOB GLASSWARE FORMING MACHINE
George E. Rowe, Wethersfield, Conn., assignor to Emhart Corporation, Bloomfield, Conn., a corporation of Connecticut
Filed Mar. 13, 1964, Ser. No. 351,695
9 Claims. (Cl. 214—1)

This invention relates to a glassware removing or take-out mechanism to be operated in association with a glassware forming machine, and, more specifically, the mechanism of this invention is especially adapted to remove two finished articles of glassware from the double mold that produces the final shape for such articles in a double gob glassware forming machine.

The ware removal mechanism of this invention is believed to be suitable for use in association with many different types of glassware forming machines. One such type, the well-known Hartford I. S. machine, is shown in U.S. Patent 2,508,890 to Rowe. This machine is a "double gob" machine capable of producing two articles of glassware simultaneously.

It is customary practice in removing the still hot articles of glassware from the final shaping mold of the machine to place them on a deadplate at a first station thereon. This deadplate is perforated, and cooling air is introduced through it to provide the initial cooling for the hot articles. Then, a mechanism will move the articles from the first station on the deadplate to a second station thereon where they are cooled further or otherwise treated. Thereafter, the articles are moved by the so-called deadplate mechanism off the deadplate and onto a conveyor which moves continuously and which is employed to transfer the glassware articles to a lehr or to a stacker, or in any event to a remote location. A double deadplate mechanism of the type that might be employed is shown in U.S. Patent 2,556,469 to Dahms.

If the articles of glassware being formed and worked upon are cylindrical, there is no serious problem involved in moving them in an upright position to stations on the deadplate and from the deadplate onto the moving conveyor located adjacent thereto. However, if the articles of glassware are other than cylindrical, for example, if they are of rectangular cross sectional shape, there is a problem in moving them around as they stand upright, and it is desirable to orient the articles about their vertical axes or center lines, preferably so that the major dimension of the cross sectional shape will be parallel with the direction of movement of the conveyor when the articles are placed thereon.

It is the general object of the present invention to provide a take-out or glassware removing mechanism for a double gob forming machine that will automatically orient the articles of glassware about the vertical axes as desired and while moving them from the machine and before placing them down in a remote position, as upon a deadplate.

As will be described in greater detail hereinafter, a mechanism of the present invention includes an arm that is pivotally supported at one end on a frame and which is driven to oscillate from a position over the final shaping mold of the glassware forming machine through a substantial angle to a position remote from the machine. A tong operating head is pivotally supported on the swinging end of the arm so as to depend therefrom in all angular positions thereof. Two tong sets are supported at the bottom end of the operating head which also includes mechanism for opening and closing the tong sets simultaneously.

In keeping with the present invention, each tong set is rotatably supported by the operating head so that it can be oscillated about a vertical axis and provision is made for identical and simultaneous angular movement or oscillation of the two tong sets. The means providing for such simultaneous oscillation and orientation of the tong sets comprises a cam that is fixedly secured to the oscillating arm, a cam follower movably supported on the head, and a gear train including a pair of gears associated with the respective tong sets. In further keeping with the present invention, the tong opening and closing mechanism is adapted to operate in any angular position assumed by the tongs.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is an elevational view showing the two extreme positions of the ware removing mechanism of this invention, its position over the glassware forming machine being shown in broken lines, and its position remote from the machine being shown in full lines;

FIG. 2 is a somewhat schematic top plan view showing a part of the glassware forming machine, the deadplate and the conveyor with which this mechanism is associated so as to show the location of this mechanism with respect thereto;

FIG. 5 is a top view of the glassware removing mechanism of this invention.

Figure 3:
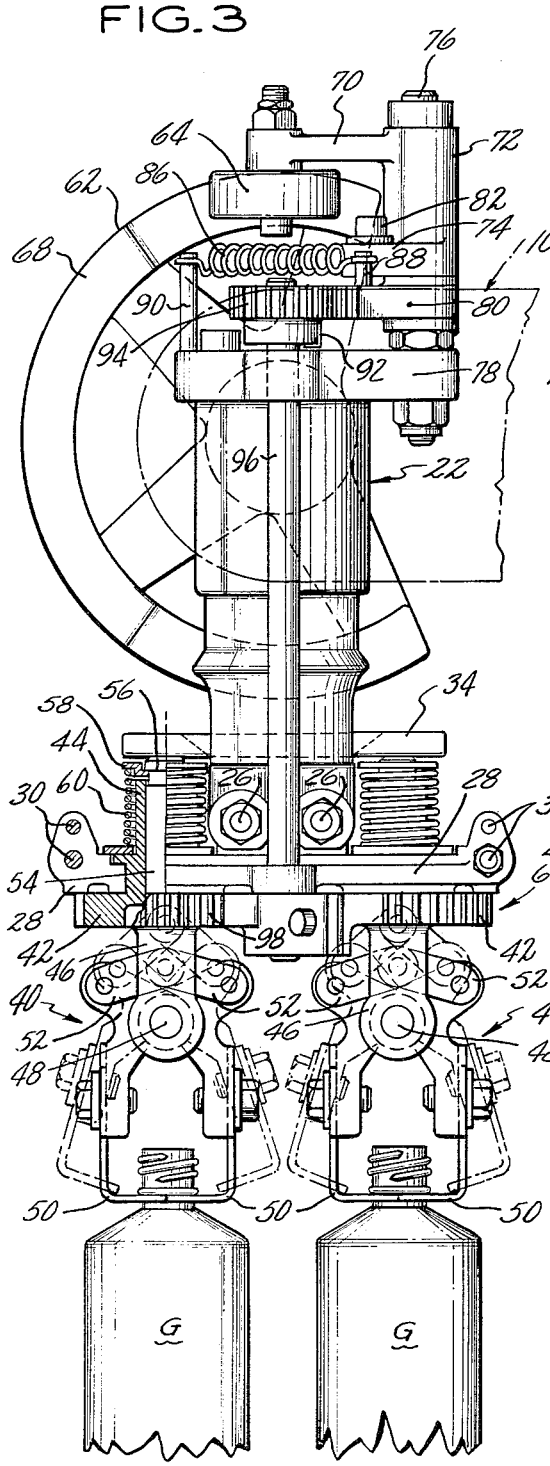
FIG. 3 is an enlarged elevational view, with parts shown in vertical cross section, of the ware removing mechanism positioned over the glassware forming machine, the view being taken from the left-hand side of such machine.

As will be seen with reference to FIGS. 1 and 2, the glassware removing mechanism includes an arm 10 that is pivotally mounted at 12 to a frame 14, and it is driven by means not shown to oscillate through a substantial angle A. Thus, the arm moves between a position M wherein its swinging or free end is located over the separable mold 16 of the glassware forming machine and a position R wherein its free end is over the deadplate 18.

As can best be understood with reference to FIG. 2, the final shaping mold 16 of the forming machine is made of two separable parts, and two articles of glassware G, G formed therein are to be taken out and placed in position on the deadplate 18 at what is designated the "first station" thereon. Thereafter, deadplate mechanism, which is not shown, moves the articles to a "second station", and after that the articles are moved off the deadplate onto the driven conveyor 20. As can be seen in FIG. 2, the articles of glassware G, G are to be rotated through about 90° on their vertical axes from the position in the mold 16 to the position in which they are set down on the deadplate 18. This orientation of the articles is provided so that their major cross-sectional dimension will be parallel to the conveyor when they are placed thereon.

As will be seen in FIG. 1, the angle A through which the arm 10 oscillates between the take-out poistion M and the remote position R is substantially 180°. A tong operating head 22 is pivotally mounted on the swinging or free end of the arm 10 so that in all angular positions of the said arm, the operating head 22 will depend or extend substantially vertically downwardly therefrom. The operating head 22 comprises a generally cylindrical housing 24 which is preferably made of a plurality of sections and which at its bottom end is connected as by bolts 26, 26 to a laterally extending two-piece tong support frame 28, the pieces of which are connected together as by bolts and dowel pins 30, 30. In addition, the bottom end portion of the tong operating head 22 is slotted vertically as shown at 32 in FIG. 4 in diametrically opposed locations to accommodate vertical movement of a horizontally disposed crossbar 34.

The crossbar 34 is pivotally connected at about its center to the bottom end of a piston rod 36 which is connected with a piston 38 forming a part of a fluid motor defined within the operating head 22 for vertical reciprocation. The fluid motor is of the one-way type, i.e., it is operated by fluid under pressure only to thrust the piston rod 36 and crossbar 34 downwardly. As will be explained hereinafter, said fluid motor elements and crossbar are spring returned upwardly. The fluid connetions and contol valves for the fluid motor are not shown, but these are conventional elements. It is to be understood that the operating means for the glassware forming machine controls and operates the fluid motor control valve so as to thrust the piston rod 36 downwardly to cause tongs to grip articles of glassware G, G in the forming machine mold 16. Also, the arm 10 is oscillated by the drive means of the glassware forming machine, and in timed relationship with the operation thereof. Fluid pressure is held in the fluid motor to maintain the grip on the articles of glassware while the arm is swung from the machine position M to the remote position R over the deadplate 18. Only then is fluid pressure released from the fluid motor of the tong operating head 22 so that the articles of glassware can be released.

There are two sets of tongs 40, 40 which are supported on the frame 28 in laterally spaced apart relationship, and they are so supported that they can be rotated or oscillated about vertical axes so as to orient articles of glassware G, G which they grip. Each set of tongs 40 is associated with and directly supported from a gear 42. As best shown in FIG. 3, each gear 42 can be called a gear wheel in that it has a hollow hub 44 that extends upwardly and is rotatably supported by the two-piece frame 28. Thus, the gear 42 for each set of tongs is rotatable about its own axis which is disposed vertically.

Depending from each gear 42 are a pair of spaced apart journals 46, 46 which receive the opposite ends of a horizontally disposed pivot pin 48. The two-tong elements 50, 50 of each set of tongs 40 are pivotally mounted on the associated pin 48. Links 52, 52 are connected to the tong members 50, 50 respectively, and each of said links is pivotally connected to the bottom end of a vertically movable plunger 54. It will be seen that the linkage connection is such that as the plunger 54 associated with a tong set is moved downwardly, its tong set will close, and as the plunger is moved upwardly, the tong set will open. It will also be seen that the plungers 54, 54 for the respective tong sets are vertically reciprocable through the centers of the tong gears 42, 42 on the axes of the bores of their hubs 44, 44.

The said plungers extend upwardly through the tong gear hubs to positions wherein they can be engaged by the respective end portions of the crossbar 34. Accordingly, the tong sets 40, 40 are closed to engage articles of glassware responsive to fluid pressure in the previously described fluid motor as it thrusts the piston rod 36 and crossbar 34 downwardly. A neck 56 is defined in the upper end of each plunger 54 to receive a split ring spring seat 58. A compression spring 60 surrounds each gear hub 44 and exerts a force upwardly against the seat 58, tending to lift the associated plunger 54 and thus tending to open the associated tong set 40 so as to release an article of glassware therefrom. Accordingly, it can be said that the tong sets are closed by the action of a fluid motor and they are opened by the action of a pair of springs 60, 60 and these springs provide the force returning the piston rod 36 and the piston 38 upwardly in the fluid motor when the fluid pressure has been released therefrom.

Figure 4:
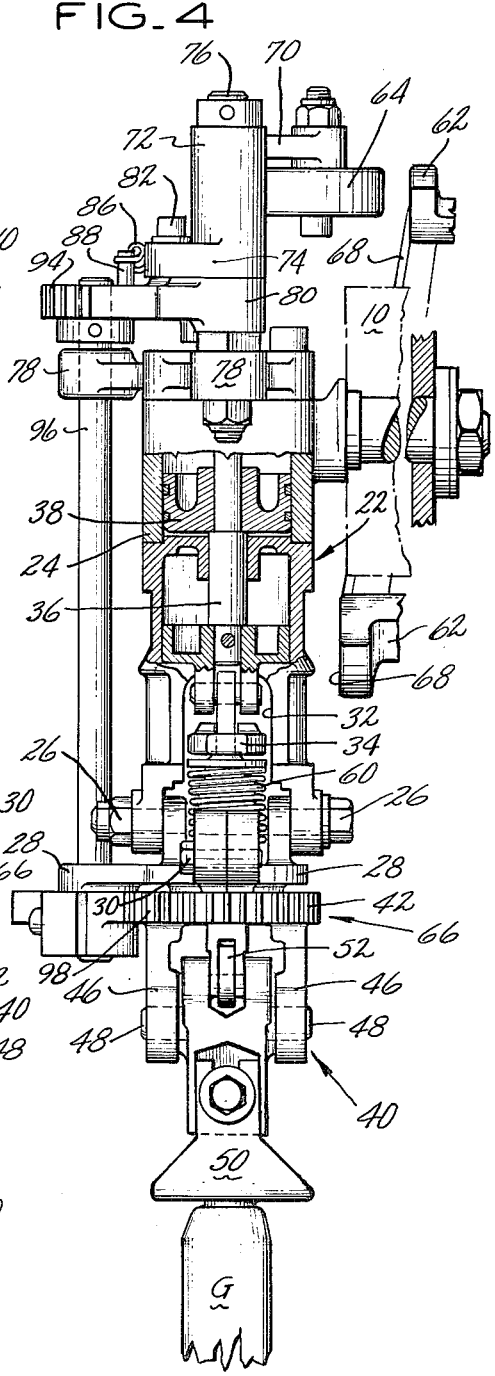
FIG. 4 is an elevational view of the same mechanism with other parts thereof being shown in vertical section, the view being taken from the front of the glassware forming machine.

The principal elements for oscillating the tong gears 42, 42 and thus for oscillating the tong sets 40, 40 during oscillation or movement of the arm 10 comprise a cam 62, a cam follower 64 and a gear train 66 (FIGS. 3, 4 and 5). When viewed in elevation as in FIGS. 1 and 3, the cam 62 looks very much like a substantial segment of a wheel. The center of the wheel-shaped cam is rigidly connected in adjusted angular or rotated position to the free or swinging end of the oscillating arm 10 on the opposite side thereof from the tong operating head 22. The peripheral face 68 of the cam 62 is sloped as best shown in FIG. 4 so as to displace the cam follower 64 horizontally during movement or oscillation of the arm 10 between the positions M and R in FIG. 1.

The follower 64 comprises a roller that is rotatably mounted on the free end of one arm 70 of a bell crank 72 that has a second arm 74. The bell crank 72 is pivotally mounted on a vertical pivot shaft 76 which extends upwardly from a support plate 78 that is secured to the top of the tong operating head 22. A gear segment or sector 80 is also rotatable on the vertical pivot shaft 76, but this sector is connected with the bell crank 72 so that it will only move with the bell crank. More specifically, a cap screw 82 extends through an arcuate slot 84 (FIG. 5) in the bell crank arm 74 and is threaded into a tapped hole in the gear sector 80. Thus, by loosening and thereafter tightening the screw 82, the gear sector 80 can be rigidly connected to the bell crank 74 in adjusted rotated positions of the sector. The bell crank 72 and the gear sector 80 are biased in a clockwise direction about the pivot shaft 76 as viewed in FIG. 5 by a tension spring 86 that has one end connected to a vertical pin 88 on the sector 80 and which has its other end connected with a pin 90 on the support plate 78. This bias urges the follower 64 toward engagement with the cam 62, but a limit on the clockwise movement of the bell crank and sector is imposed by a stop pin 92 projecting downwardly from the gear sector 80 to engage a boss on the support plate 78. Thus, the screw 82 and slot 84 arrangement to adjust the sector 80 relative to the bell crank 72 is effected to adjust the follower 64 relative to the cam 62. In this manner, the follower 64 can be adjusted to engage only a portion of the cam face 68, and as will be more fully understood from the remaining description, this will adjust the angle of oscillation of the tong sets 40, 40.

The gear segment or sector 80 engages a pinion 94 which is keyed to the upper end of a shaft 96, the said shaft being disposed vertically and journaled in the support plate 78 adjacent its upper end and in the tong support frame 28 adjacent its lower end. The bottom end of the shaft 96 projects through the tong support frame 28, and a large gear segment 98 is secured to the bottom end portion to engage both of the tong gears 42, 42 simultaneously. Thus, rotation of the upper gear segment 80 caused by the cooperation of the cam 62 and the cam follower 64 will result in simultaneous rotation of the tong gears 42, 42 on their vertical axes about which the articles of glassware G, G are also rotated.

In most cases, when orienting the articles of glassware G, G it will not be necessary to rotate them through more than 90° about their vertical axes in movement from the machine to the deadplate, but this can be done when necessary. The mechanism as shown and described above will accommodate complete 90° rotation or orientation of the glassware while the arm 10 swings through 180°. That is, if the screw and slot connection between the bell crank 72 and the gear sector 80 is made as shown at FIG. 5 so that the cam follower 64 engages the cam face 68 with the arm in the position M over the machine, the follower 64 will engage the said cam face 68 throughout the complete 180° movement of the arm 10 to the position R and this will displace the follower 64 and pivot the bell crank 72 sufficient to cause 90° rotation of the articles of glassware G, G from their relative position shown in broken lines in FIG. 1 to their relative position shown in full lines in FIG. 1. However, if it is desired to rotate the articles of glassware through less than 90° during the swinging movement of the arm 10, it is only necessary to adjust the bell crank 72 counterclockwise relative to the segment 80 as viewed in FIG. 5, this taking the follower 64 out of engagement with the cam face 68 during the initial part of the pivoting movement of the arm 10. Thus, the glassware articles will be rotated less than 90° to any angle selected. Obviously, when the arm 10 returns from the full line position to the broken line position shown in FIG. 1, the tong sets will be rotated back to the initial or broken line position.

The invention claimed is:

1. A mechanism for removing ware from a double gob glassware forming machine and comprising an arm driven to oscillate through a substantial angle between a first or ware pick-up position over the machine to a second or ware release position remote from the machine, a tong head pivotally mounted on the free end of said arm as to depend therefrom, two sets of tongs supported from said head in laterally spaced apart relationship each including a gear connecting the set to the head for rotation about the generally vertical axis of the gear, means for simultaneously opening and closing said sets of tongs in any rotated position thereof, and means for rotating said sets of tongs on their gear axes while said arm moves between said first and second positions including a cam rigidly connected to said arm, a cam follower movably supported on said head to engage said cam, and gear means operatively conecting said follower and both of said tong gears to oscillate them on their axes responsive to oscillation of said arm.

2. A ware removing mechanism as set forth in claim 1 wherein said cam follower is connected to the end of a crank arm, and wherein said gear means includes a gear segment rotated by said crank arm, a shaft having a pinion at one end engaged by said gear segment and a second gear segment at its other end simultaneously engaging both of said tong gears.

3. A ware removing mechanism as set forth in claim 1 wherein said means for simultaneously opening and closing said sets of tongs comprises a fluid motor in said head having a piston rod, a crossbar connected to said piston rod, tong operating linkages for each set including a plunger engageable by said crossbar to close the tongs responsive to said fluid motor, and spring means biasing said plunger oppositely of said motor to open said tongs.

4. A ware removing mechanism as set forth in claim 3 wherein said cam follower is connected to the end of a crank arm, and wherein said gear means includes a gear segment rotated by said crank arm, a shaft having a pinion at one end engaged by said gear segment and a second gear segment at its other end simultaneously engaging both of said tong gears.

5. A mechanism for removing ware from a double gob glassware forming machine and comprising an arm driven to oscillate through a substantial angle between a first or ware pick-up position over the machine to a second or ware release position remote from the machine, a tong operating head pivotally mounted on the free end of the arm so as to depend therefrom and carrying a laterally extending tong support frame at its bottom end and having a fluid motor including a piston rod reciprocable toward and from said frame, two sets of tongs supported from said frame in laterally spaced apart relationship each including a gear connecting the set to the frame for rotation about the generally vertical axis of the gear, means for simultaneously opening and closing said sets of tongs including linkages interconnecting said tongs and said piston rod in any rotated position of said tong gears, and means for rotating said sets of tongs on their gear axes while said arm moves between said first and second positions including a cam rigidly connected to said arm, a cam follower movably supported on said head to engage said cam, and gear means operatively connecting said follower and both of said tong gears to oscillate them on their axes responsive to oscillation of said arm.

6. A mechanism for removing ware from a double gob glassware forming machine and comprising an arm driven to oscillate through a substantial angle between a first or ware pickup position over the machine to a second or ware release position remote from the machine, a tong operating head pivotally mounted on the free end of the arm so as to depend therefrom and carrying a laterally extending tong support frame at its bottom end and having a fluid motor including a piston rod reciprocable toward and from said frame, two sets of tongs supported from said frame in laterally spaced apart relationship each including a gear wheel that is connected to the frame for rotation on a vertical axis and which pivotally supports its associated tong set in depending fashion therefrom, means for simultaneously opening and closing said sets of tongs including linkages interconnecting said tong sets and said piston rod in any rotated position of said tong gears, and means for rotating said sets of tongs on their gear axes while said arm moves between said first and second positions including a cam rigidly connected to said arm, a cam follower movably supported on said head to engage said cam, and gear means operatively connecting said follower and both of said tong gears to oscillate them on their axes responsive to oscillation of said arm.

7. A ware removing mechanism as set forth in claim 6 wherein said cam follower is connected to the end of a crank arm, and wherein said gear means includes a gear segment rotated by said crank arm, a vertical shaft rotatably supported by said tong support frame and having a pinion at its top end engaged by said gear segment and a second gear segment at its bottom end simultaneously engaging both of said tong gears.

8. A ware removing mechanism as set forth in claim 6 wherein said means for simultaneously opening and closing said sets of tongs comprises a fluid motor in said head having a piston rod, a crossbar connected to said piston rod, tong operating linkages for each set including a plunger reciprocable on the axis of its associated wheel gear and engageable by said crossbar to close the tongs responsive to said fluid motor, and spring means biasing said plunger oppositely of said motor to open said tongs.

9. A ware removing mechanism as set forth in claim 8 wherein said cam follower is connected to the end of a crank arm, and wherein said gear means includes a gear segment rotated by said crank arm, a vertical shaft rotatably supported by said tong support frame and having a pinion at its top end engaged by said gear segment and a second gear segment at its bottom end simultaneously engaging both of said tong gears.

No references cited.

HUGO O. SCHULZ, *Primary Examiner.*